(12) United States Patent
Lee

(10) Patent No.: US 8,732,425 B2
(45) Date of Patent: May 20, 2014

(54) ELECTRONIC APPARATUS

(75) Inventor: June-bum Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 11/318,544

(22) Filed: Dec. 28, 2005

(65) Prior Publication Data

US 2006/0152993 A1  Jul. 13, 2006

(30) Foreign Application Priority Data

Jan. 11, 2005 (KR) ........................ 10-2005-0002582

(51) Int. Cl.
*G06F 12/00* (2006.01)
*H03K 17/16* (2006.01)

(52) U.S. Cl.
USPC ................ 711/167; 711/105; 326/21; 326/30

(58) Field of Classification Search
USPC .................. 711/105, 167; 333/22; 326/21, 30
See application file for complete search history.

(56) References Cited

U.S. PATENT DOCUMENTS

| | | | | |
|---|---|---|---|---|
| 5,057,783 A * | 10/1991 | Gubisch | ........................ | 324/710 |
| 5,315,164 A * | 5/1994 | Broughton | .................... | 327/175 |
| 5,635,761 A * | 6/1997 | Cao et al. | ....................... | 257/700 |
| 6,046,653 A * | 4/2000 | Yamada | ............................ | 333/32 |
| 6,125,419 A * | 9/2000 | Umemura et al. | ............ | 710/110 |
| 6,140,885 A * | 10/2000 | Abadeer et al. | ............... | 333/17.3 |
| 6,665,736 B1 * | 12/2003 | Fan | ................................. | 710/2 |
| 6,762,620 B2 * | 7/2004 | Jang et al. | ........................ | 326/30 |
| 6,836,144 B1 * | 12/2004 | Bui et al. | ........................ | 326/32 |
| 6,998,870 B1 * | 2/2006 | Gulick et al. | .................... | 326/30 |
| 7,007,175 B2 * | 2/2006 | Chang et al. | .................. | 713/300 |
| 7,038,486 B2 * | 5/2006 | Aoyama et al. | .................. | 326/30 |
| 7,051,129 B2 * | 5/2006 | Horowitz et al. | ............. | 710/104 |
| 7,239,170 B2 * | 7/2007 | Suen et al. | ....................... | 326/30 |
| 7,257,725 B2 * | 8/2007 | Osaka et al. | .................. | 713/500 |
| 7,299,330 B2 * | 11/2007 | Gillingham et al. | .......... | 711/167 |
| 2002/0156959 A1 * | 10/2002 | Kuo | .............................. | 710/301 |
| 2003/0043624 A1 * | 3/2003 | Roohparvar et al. | ..... | 365/185.08 |
| 2003/0235107 A1 | 12/2003 | Jang | | |
| 2004/0145963 A1 * | 7/2004 | Byon | ............................ | 365/233 |

FOREIGN PATENT DOCUMENTS

| | | |
|---|---|---|
| CN | 1403928 | 3/2003 |
| CN | 1467596 | 1/2004 |
| JP | 2002-82744 | 3/2002 |
| JP | 2003-271269 | 9/2003 |
| JP | 2003-271538 | 9/2003 |
| KR | 2002-13388 | 2/2002 |

OTHER PUBLICATIONS

HyperTransport I/O Link Specification. Aug. 25, 2003. HyperTransport Technology Consortium. pp. 1-2, 175-177.*

(Continued)

*Primary Examiner* — Tuan Thai
*Assistant Examiner* — Samuel Dillon
(74) *Attorney, Agent, or Firm* — Jefferson IP Law, LLP

(57) ABSTRACT

An electronic apparatus is provided with an arrangement of discrete circuit elements designed to reduce power consumption. Such an arrangement comprises a memory; a memory controller to generate a control signal which controls the memory according to a predetermined operating clock; and a transmission line disposed between the memory controller and the memory to allow the control signal to be transmitted to the memory, wherein the timing of the control signal is controlled by a change of the operating clock.

7 Claims, 5 Drawing Sheets

(56) References Cited

OTHER PUBLICATIONS

Yoo et al. A 1.8-V 700-mb/s/pin 512-mb DDR-II SDRAM with on-die termination and off-chip driver calibration. IEEE Journal of Solid-State Circuits. vol. 39, No. 6, pp. 941-951, Jun. 2004.*

John F. Wakerly, Digital Design Principles and Practices: Transmission Lines, Reflections, and Termination supplementary material, 2006, Pearson Education, Inc., 4th Ed. Available at: http://web.cecs.pdx.edu/~greenwd/xmsnLine_notes.pdf.*

* cited by examiner

ELECTRONIC APPARATUS

CROSS-REFERENCE TO RELATED APPLICATION

This application claims all benefits accruing under 35 U.S.C. §119 from Korean Patent Application No. 2005-2582 filed on Jan. 11, 2005 in the Korean Intellectual Property Office, the disclosure of which is incorporated by reference herein.

BACKGROUND OF THE INVENTION

1. Field of the Invention

The present invention relates to an electronic apparatus, and more particularly, to an electronic apparatus that reduces power consumption.

2. Related Art

Electronic apparatuses, such as mobile personal computers (PCs) or other mobile devices, typically incorporate some form of power saving and power management techniques to reduce power consumption, particularly, from a battery in order to maximum available battery usage time.

One example of such power saving and power management techniques is to reduce signal voltages for signal transmission. However, as signal voltages have been lowered in electronic apparatuses, their respective circuits have suffered from signal reflections generated by impedance mismatches. Such reflections change signal waveforms, and cause overshoot or undershoot, thereby distorting signals. As a result, many electronic apparatuses employ a predetermined resistor (hereinafter, referred as a "terminating resistor") in a signal transmission line to match the impedance of the respective circuits and prevent reflections. In addition, a memory of these electronic apparatuses is supplied with a predetermined voltage (hereinafter, referred as a "terminating voltage"). The terminating voltage together with the terminating resistor can raise the memory signal level and improve the memory processing speed.

FIG. 1 illustrates a typical memory and a memory controller usable in such an electronic apparatus.

As shown in FIG. 1, a memory 10 and a memory controller 20 are connected to each other through a transmission line 30 having a length corresponding to reflected signal waves. The transmission line 30 transmits a control signal, which is generated by the memory controller 20 according to a predetermined operating clock, to the memory 10.

A terminal of the transmission line 30 is connected to a terminating resistor 40 to match the impedance, and a terminating voltage 50 to raise the signal level.

Specifically, the control signal transmitted between the memory 10 and the memory controller 20 has a level between 0V and 1.8V, and raises the signal level as much as the terminating voltage 50. For example, if the terminating voltage 50 is 0.9V, the signal level of the control signal is changed to 0.9V-1.8V, from 0V-1.8V (i.e., the lowest value thereof is raised).

If the signal level rises as described in connection with FIG. 1, the voltage difference of the control signal is reduced, thereby making the timing of the control signal faster and improving the processing speed.

However, the terminating voltage 50 is only used to raise the signal level of the control signal. Accordingly, an electronic apparatus continuously consumes power due to the terminating voltage 50 even when such an electronic apparatus is in a standby mode, not performing any operation. As a result, electronic apparatuses such as notebook PCs, which employ a battery as a power source, consume more power, thereby decreasing usage time of the battery.

Thus, a new technique is required to reduce power consumption in such an electronic apparatus due to the terminating voltage 50.

Korean Patent First Publication No. 2002-0013388 discloses a directional combination type data transmission system which uses a traveling wave and a reflection wave generating total reflection by making a terminal of a main data transmission line between a DRAM memory and a memory controller an open terminal or a short terminal. Such an arrangement can narrow the intervals between DRAM memory banks, which allow individual memory banks to be installed more densely in the memory pack, and reduce the data writing latency time. However, Korean Patent First Publication No. 2002-0013388 does not disclose any method for reducing the increased power consumption caused by the voltage used for raising the signal level of the control signal.

SUMMARY OF THE INVENTION

Various aspects and example embodiments of the present invention advantageously provide an electronic apparatus which reduces power consumption due to a terminating voltage used to raise a signal level of a control signal transmitted between a memory controller and a memory and to increase usage time of a battery.

Additional aspects and/or advantages of the invention will be set forth in part in the description which follows and, in part, will be obvious from the description, or may be learned by practice of the invention.

According to an aspect of the present invention, there is provided an electronic apparatus, comprising a memory; a memory controller to generate a control signal which controls operations of the memory according to a predetermined operating clock; and a transmission line disposed between the memory controller and the memory for transmitting the control signal to be transmitted from the memory controller to the memory, wherein a timing of the control signal is controlled by a change of the operating clock.

Such an electronic apparatus further comprises a resistor, which is connected in series between the memory controller and the memory to match impedance and to eliminate any signal overshoot and/or undershoot.

According to another aspect of the present invention, there is provided an electronic apparatus, comprising a memory; a memory controller to generate a control signal which controls operations of the memory according to a predetermined operating clock; and a transmission line disposed between the memory controller and the memory to allow the control signal to be transmitted from the memory controller to the memory, wherein a timing of the control signal is controlled by the length of the control signal.

Such an electronic apparatus further comprises a resistor, which is connected in series between the memory controller and the memory to match impedance and to eliminate any signal overshoot and/or undershoot.

In accordance with yet another aspect of the present invention, an electronic apparatus comprises a device; and a device controller connected directly to the device, via a signal transmission line, to generate a control signal for controlling operations of the device according to an operating clock, wherein the signal transmission line is driven by the device controller without an independent terminating voltage, to transmit the control signal from the device controller to the device, and a timing of the control signal is controlled by one of a speed of the operating clock and a length of the control signal.

The length of the signal transmission line connecting the memory controller to the memory can be selected to minimize the effect of reflections of the control signal transmitted from the memory controller to the memory.

The timing of the control signal represents the time to transmit the control signal from the memory controller to the memory. The speed of the operating clock is proportional to the timing of the control signal, and can be increased to compensate for any slower timing of the control signal to prevent signal reflections. Similarly, the timing of the control signal is proportional to the speed of the operating clock, and the length (duty cycle) of the control signal can be shortened to compensate for any slower timing of the control signal to prevent signal reflections.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
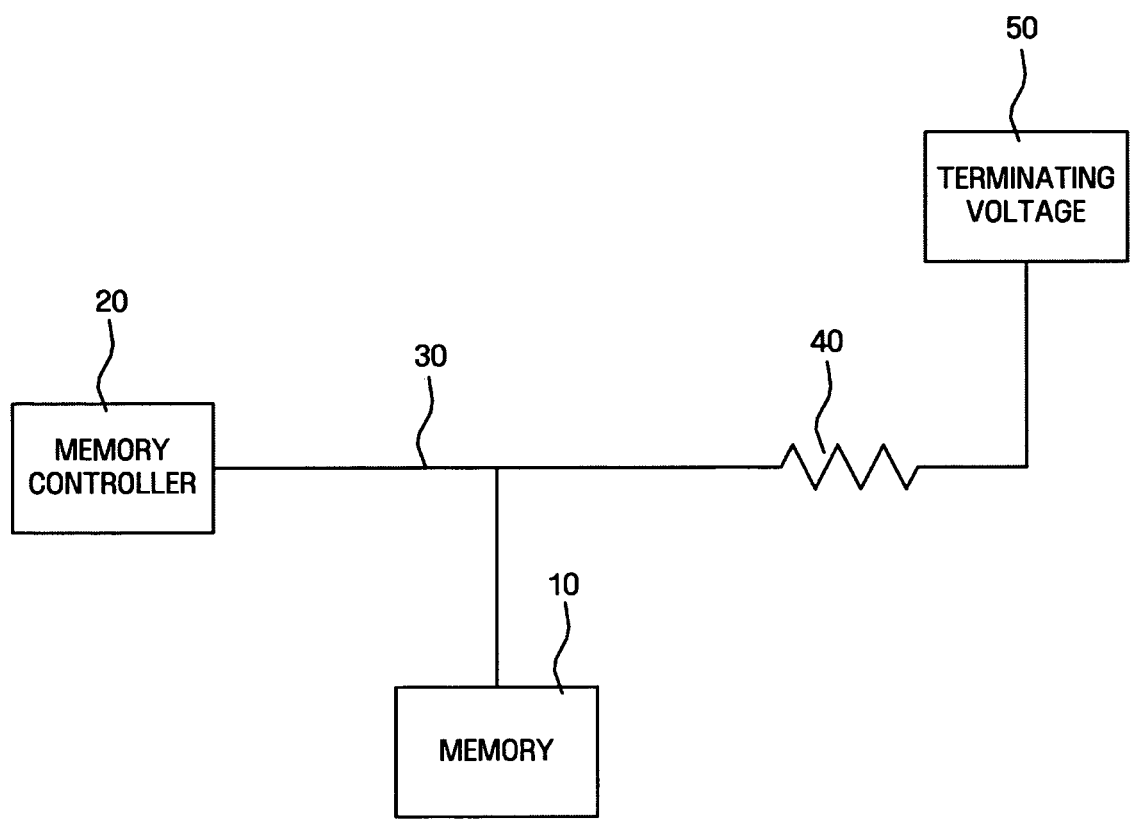
FIG. 1 is a block diagram of an example memory and memory controller arrangement in an electronic apparatus.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
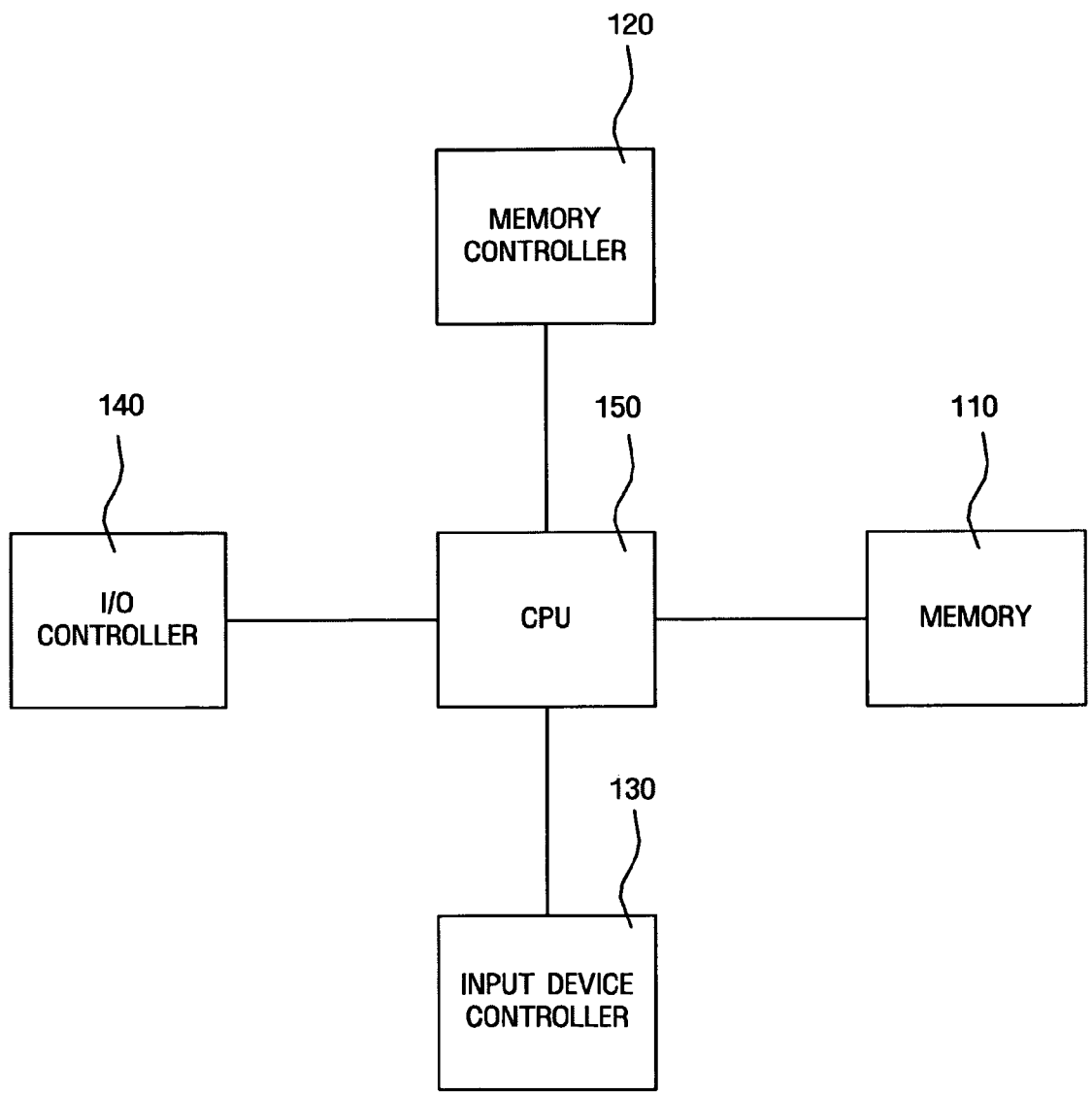
FIG. 2 is a block diagram of an electronic apparatus according to an embodiment of the present invention.

FIG. 2 is a block diagram of an electronic apparatus according to an embodiment of the present invention.

As shown FIG. 2, the electronic apparatus according to the embodiment of the present invention comprises a memory 110 to store data or a program such as an operating system (OS); a memory controller 120 arranged to control the memory 110; an input device controller 130 arranged to control input devices such as a keyboard or a cursor control device, such as a mouse, a track ball, a touch pad or a joystick; an input/output (I/O) controller 140 arranged to control the input and output of the data; and a host processor (CPU) 150 arranged to generate a command to control operation of the memory 110, the memory controller 120, the input device controller 130 and the I/O controller 140.

The electronic apparatus according to the embodiment of the present invention may comprise the respective elements in a hardware manner or selectively. As an example of the present invention, the memory 110 connected to the CPU 150 can be a double data rate 2 SDRAM (DDR2-SDRAM) which offers greater bandwidth and density in a smaller memory package along with a reduction in power consumption as well as higher clock rate and data rate operations; however, the present invention is not limited thereto. For example, the memory 110 can also be provided as a cache memory, ROM, PROM, EPROM, EEPROM, SRAM or DRAM.

Figure 3:
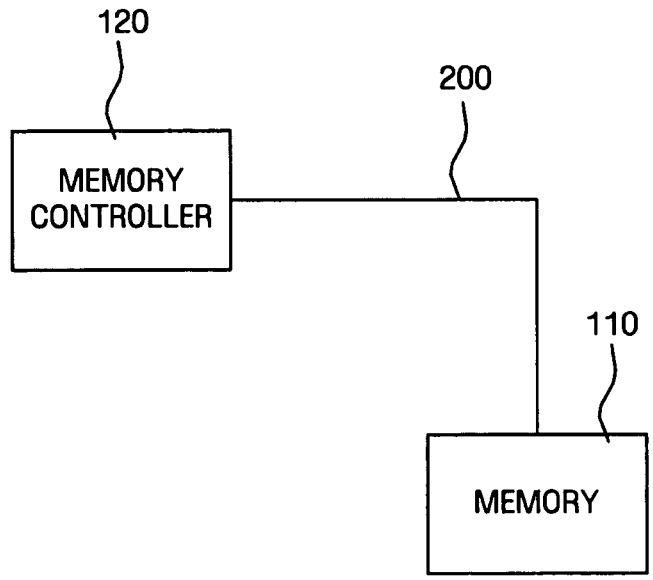
FIG. 3 is a block diagram of a memory and memory controller arrangement according to a first embodiment of the present invention.

FIG. 3 illustrates an example memory 110 and memory controller 120 arrangement according to a first embodiment of the present invention.

As shown in FIG. 3, the memory 110 and the memory controller 120 are connected to each other through a transmission line 200 to transmit a control signal, which is generated by the memory controller 120, to control the memory 110. At this time, the length of the transmission line 200 may be long enough to minimize the effect of reflections of the transmitted control signal. In accordance with an embodiment of the present invention, a terminating resistor and a terminating voltage shown in FIG. 1 are excluded from FIG. 3.

Figure 4:
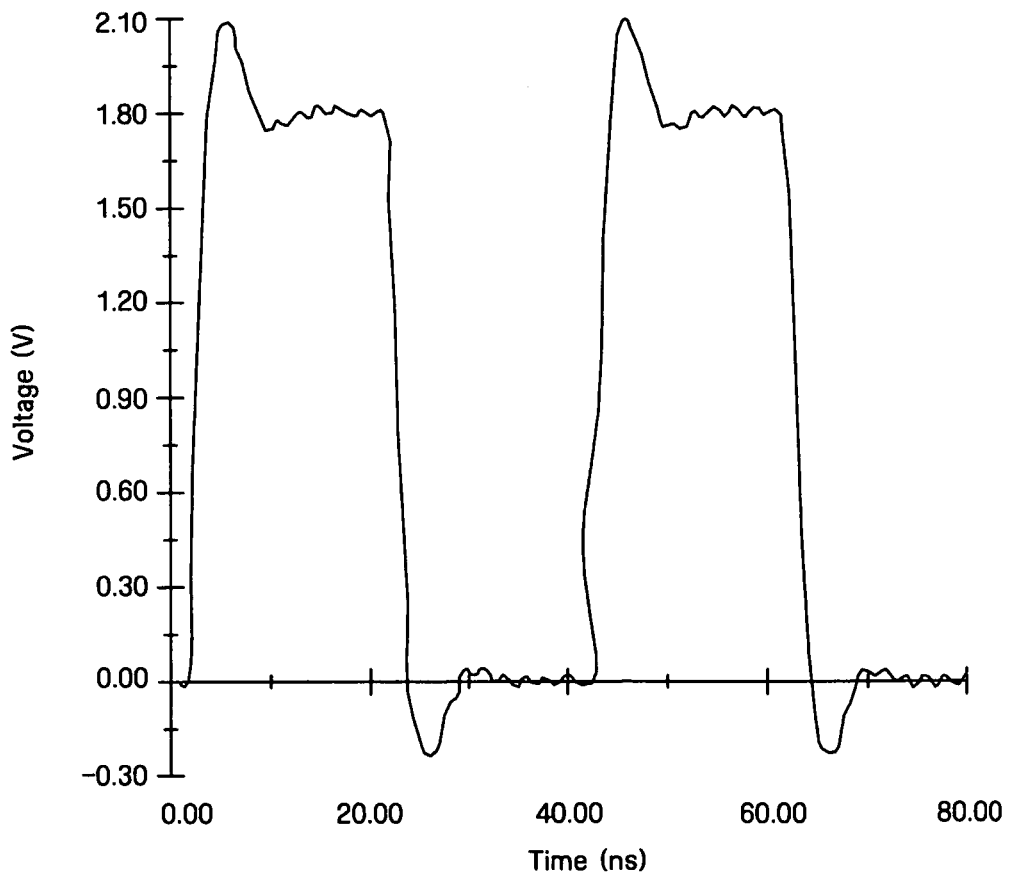
FIG. 4 illustrates a waveform of a control signal, which is generated by the memory controller shown in FIG. 3.
Figure 5:
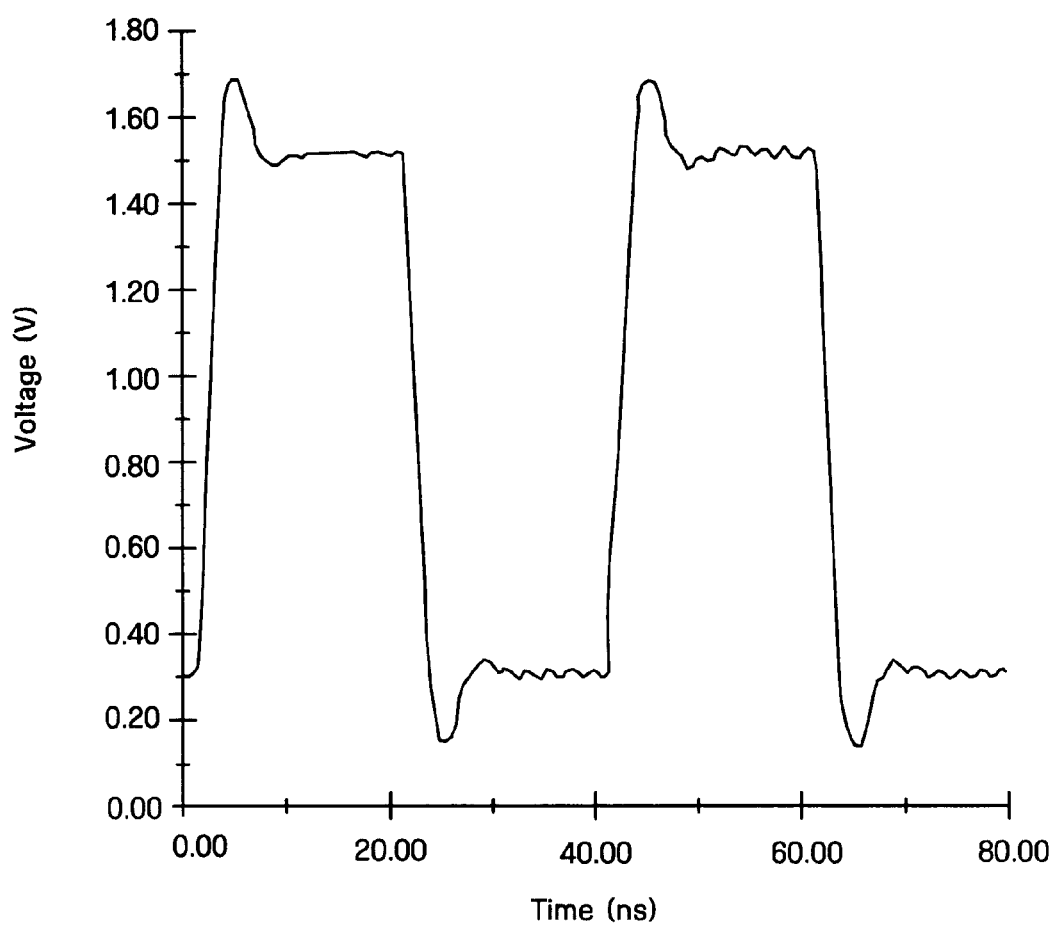
FIG. 5 illustrates a waveform of a control signal generated by the memory controller if a terminating resistor and a terminating voltage are incorporated into the memory and memory controller arrangement shown in FIG. 3.

FIG. 4 illustrates an example waveform of the control signal generated by the memory controller 120 shown in FIG. 3. FIG. 5 illustrates an example waveform of the control signal generated by the memory controller 20 shown in FIG. 1.

As shown in FIG. 4, the control signal waveform is generated by the memory controller 120 shown in FIG. 3, wherein the timing thereof becomes slower by 220-320 ps when compared to the control signal waveform shown in FIG. 5, and overshoot and undershoot are increased to 0.405V and 0.377V respectively, and ring back becomes large.

That is, in the first embodiment of the present invention, as shown in FIG. 2 and FIG. 3 the terminating voltage, which raises the signal level of the control signal, is omitted (avoided), the control signal level is 0V through 1.8V, and the voltage difference and swing width are relatively large, thereby slowing the timing and increasing the overshoot and undershoot due to the omission of the terminating resistor, which restrains the overshoot and undershoot.

The control signal generated by the memory controller 120 is generated according to a predetermined operating clock. Thus, if the terminating voltage is omitted and the timing of the control signal becomes slower, the control signal may not be transmitted to the memory 110 properly. As a result, an operating clock may be increased as much as the slower timing of the control signal, and/or the length of the control signal may be shortened to prevent the signal from being distorted.

Specifically, the timing of the control signal refers to the time required to transmit the control signal generated by the memory controller 120 to the memory 110. If the terminating voltage is provided as shown in FIG. 1, the control signal can be quickly transmitted due to the absence of reflections. However, if the terminating voltage is not provided, the control signal is transmitted relatively slowly and reflections are generated. If the control signal with a slower timing is used without any compensation, the signal may be distorted as the control signal is initially designed with consideration to the operating clock. Thus, the operating clock can be enlarged to compensate for the slower timing, and/or the length of the control signal can be shortened.

If the terminating voltage is omitted from the memory and memory controller arrangement as shown FIG. 1, the control signal can be prevented from being distorted by controlling the operating clock of the memory controller 120. Further, the electronic apparatus such as a notebook computer employing a battery can reduce its power consumption while performing operations or being in a standby mode, thereby increasing usage time of the battery and using the battery more efficiently.

Figure 6:
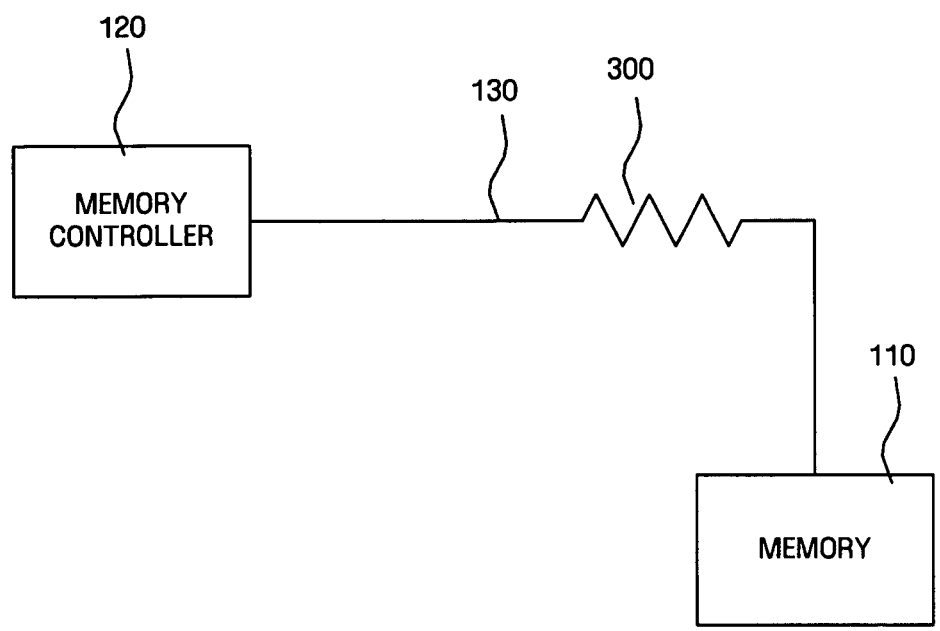
FIG. 6 is a block diagram of a memory and memory controller arrangement according to a second embodiment of the present invention.

FIG. 6 illustrates a memory and memory controller arrangement according to a second embodiment of the present invention.

As shown in FIG. 6, overshoot and undershoot, which are increased due to an omission of a terminating resistor shown in FIG. 1, may be reduced by installing a predetermined resistor 300 between the memory 110 and the memory controller 120. The resistor 300 may eliminate the overshoot and the undershoot, which are increased by the omission of the terminating voltage. The generated overshoot and undershoot do not affect the operation of the memory 110. However, it may affect the memory chip and damage the chip in the future. Accordingly, the second embodiment of the present invention may prevent the possibility of damage to the memory chip.

Figure 7:
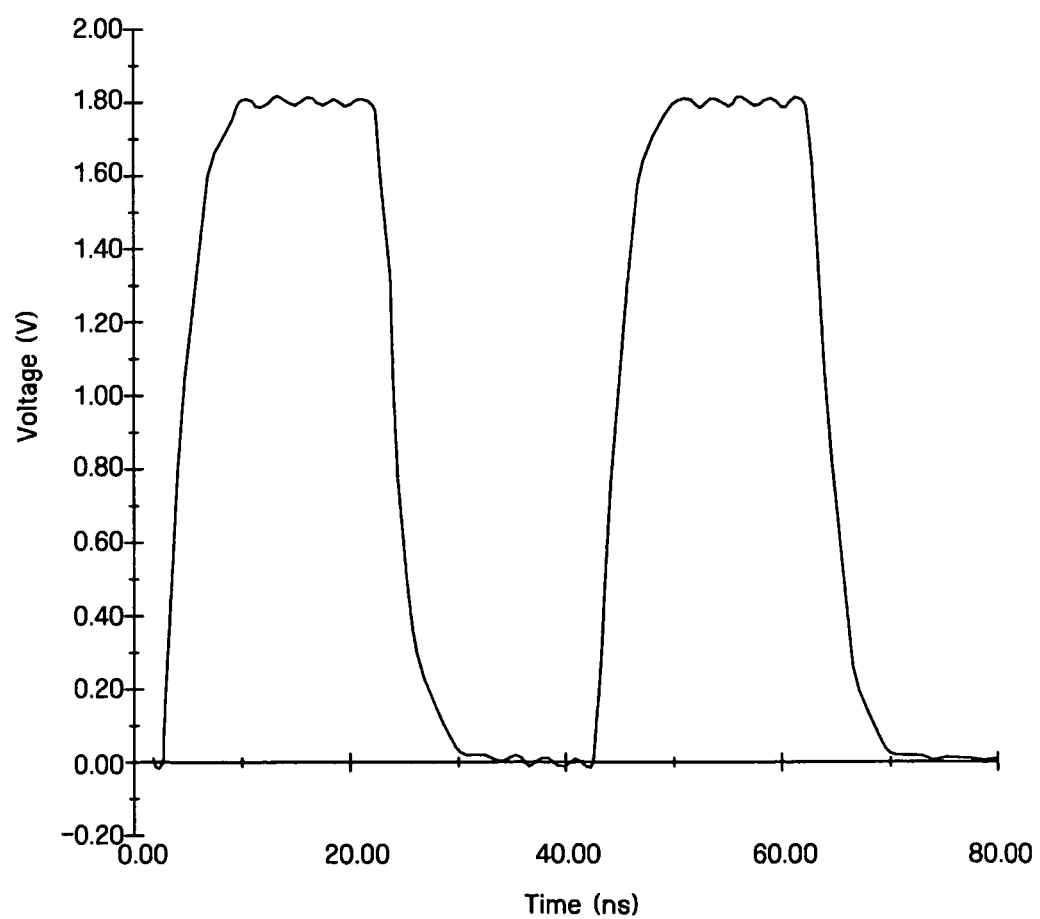
FIG. 7 illustrates a waveform of a control signal generated by the memory controller shown in FIG. 6.

As shown in FIG. 7, the increased overshoot and undershoot are eliminated due to the resistor 300 disposed between the memory 110 and the memory controller 120. That is, the timing of the control signal waveform shown in FIG. 7 becomes slower by 300 ps and the overshoot and undershoot are reduced by 0.290V and 0.277V respectively, and the ring back is removed.

According to the electronic apparatus of the present invention, a terminating voltage, which raises the signal level of a control signal generated by a memory controller, is omitted, thereby reducing the electronic apparatus's power consumption and thus increasing the usage time of its battery.

Although the preferred embodiment of the present invention has been described, it will be understood by those skilled in the art that the present invention should not be limited to the described preferred embodiment, but various changes and modifications can be made within the spirit and scope of the present invention. For example, components of an electronic apparatus, as shown in FIG. 1, can be arranged differently and/or integrated in fewer elements (i.e., a memory controller and a CPU can be implemented as a single chipset along with an I/O controller) as long as the terminating voltage is avoided in the manner as described to reduce power consumption. Similarly, the memory and memory controller arrangement can be replaced with other discrete components of an electronic apparatus sharing a common transmission line. Accordingly, it is intended, therefore, that the present invention not be limited to the various example embodiments disclosed, but that the present invention includes all embodiments falling within the scope of the appended claims.

What is claimed is:

1. An electronic apparatus, comprising:
a Double Data Rate (DDR) memory;
a memory controller to generate a control signal for controlling operations of the DDR memory; and
a transmission line arranged so as to transmit the control signal from the memory controller to the memory;
wherein a waveform of the control signal transmitted from the memory controller to the DDR memory includes an overshoot portion and an undershoot portion due to the omission of the terminating resistor,
wherein a portion of the transmission line disposed between the memory controller and the DDR memory has a predetermined length which is selected such that a waveform level of the waveform of the control signal including the overshoot portion, transmitted from the memory controller to the DDR memory, does not exceed a predefined upper voltage level,
wherein no terminating voltage, or terminating resister connected thereto, is applied to the portion of the transmission line disposed between the memory controller and the DDR memory, and
wherein the memory controller shortens a duty cycle of the control signal to prevent a timing of the control signal from being slower due to the omission of the terminating voltage.

2. The electronic apparatus according to claim 1, further comprising a resistor connected in series between the memory controller and the memory to match impedance and to prevent reflections, including any signal overshoot and/or undershoot distorting the control signal.

3. The electronic apparatus of claim 1, wherein the predefined upper voltage level is 1.8V.

4. The electronic apparatus of claim 1, wherein the length of the transmission line, disposed between the memory controller and the DDR memory, is selected such that a voltage level of the waveform of the control signal including the undershoot portion, transmitted from the memory controller to the DDR memory, does not fall below 0V.

5. An electronic apparatus, comprising:
a Double Data Rate (DDR) memory;
a memory controller to generate a control signal for controlling operations of the DDR memory;
a transmission line arranged so as to allow the control signal to be transmitted to the memory; and
a resistor connected in series between the memory controller and the DDR memory to match impedance and to prevent reflections, including any signal overshoot and/or undershoot distorting the control signal,
wherein a waveform of the control signal transmitted from the memory controller to the DDR memory includes an overshoot portion and an undershoot portion due to the omission of the terminating resistor, and
wherein a portion of the transmission line disposed between the memory controller and the DDR memory has a predetermined length which is selected such that a waveform level of the waveform of the control signal including the overshoot portion, transmitted from the memory controller to the DDR memory, does not exceed a predefined upper voltage level,
wherein no terminating voltage, or terminating resister connected thereto, is applied to the portion of the transmission line disposed between the memory controller and the DDR memory, and wherein the memory controller shortens a duty cycle of the control signal to prevent a timing of the control signal from being slower due to the omission of the terminating voltage.

6. An electronic apparatus, comprising:

a Double Data Rate (DDR) memory;

a memory controller to generate a control signal for controlling operations of the DDR memory;

a transmission line arranged so as to allow the control signal to be transmitted to the memory; and a resistor connected in series between the memory controller and the DDR memory to match impedance and to prevent any signal overshoot and/or undershoot distorting the control signal, wherein a waveform of the control signal transmitted from the memory controller to the DDR memory includes an overshoot portion and an undershoot portion due to the omission of the terminating resistor, wherein a portion of the transmission line connecting the memory controller to the memory has a predetermined length designed to minimize the effect of reflections of the control signal transmitted from the memory controller to the memory, wherein no terminating voltage, or terminating resistor connected thereto, is applied to the portion of the transmission line disposed between the memory controller and the DDR memory, and wherein the memory controller shortens a duty cycle of the control signal to prevent a timing of the control signal from being slower due to the omission of the terminating voltage.

7. An electronic apparatus comprising:

a device; and a device controller connected directly to the device, via a signal transmission line, to generate a control signal for controlling operations of the device, wherein a waveform of the control signal transmitted from the device controller to the device includes an overshoot portion and an undershoot portion due to the omission of the terminating resistor; and wherein the length of the signal transmission line connecting the memory controller to the memory is selected such that a voltage level of the waveform of the control signal including the overshoot portion, transmitted from the device controller to the device, does not exceed a predetermined upper voltage level, wherein no terminating voltage, or terminating resistor connected thereto, is applied to the transmission line disposed between the device controller and the device, and wherein the device controller shortens a duty cycle of the control signal to prevent a timing of the control signal from being slower due to the omission of the terminating voltage.

* * * * *